(12) United States Patent
Feng et al.

(10) Patent No.: US 8,090,352 B2
(45) Date of Patent: Jan. 3, 2012

(54) METHOD FOR SENDING INDIVIDUATION RECEIPT INFORMATION BY A SHORT MESSAGE RECEIVING TERMINAL

(75) Inventors: Lingjuan Feng, Beijing (CN); Rongrong Yu, Beijing (CN); Jianfeng Tang, Beijing (CN); Xiangyang Yuan, Beijing (CN); Xinbo Wang, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 649 days.

(21) Appl. No.: 12/097,213

(22) PCT Filed: Aug. 25, 2006

(86) PCT No.: PCT/CN2006/002196
§ 371 (c)(1),
(2), (4) Date: Oct. 24, 2008

(87) PCT Pub. No.: WO2007/068170
PCT Pub. Date: Jun. 21, 2007

(65) Prior Publication Data
US 2009/0104921 A1   Apr. 23, 2009

(30) Foreign Application Priority Data
Dec. 12, 2005   (CN) .......................... 2005 1 0130126

(51) Int. Cl.
*H04M 1/725* (2006.01)
*H04W 4/00* (2009.01)
(52) U.S. Cl. .................... 455/412.2; 455/412.1; 455/466
(58) Field of Classification Search ............... 455/412.1, 455/412.2, 414.1, 466
See application file for complete search history.

(56) References Cited

U.S. PATENT DOCUMENTS
7,673,055 B2 *  3/2010  Scott et al. .................... 709/228
2005/0255869 A1 * 11/2005  Byers et al. ................... 455/466

FOREIGN PATENT DOCUMENTS
| CN | 1545348 | 11/2004 |
| KR | 10-2004-0083615 | 10/2004 |
| KR | 10-2005-0107685 | 11/2005 |
| WO | WO 02/03669 | 1/2002 |

* cited by examiner

*Primary Examiner* — Un C Cho
(74) *Attorney, Agent, or Firm* — Merchant & Gould P.C.

(57) ABSTRACT

The present invention relates to a method for a short message receiving terminal to send individuation receipt information. It executes the following steps: A subscriber applies to open the individuation receipt service after a short message is received and customizes individuation receipt information. After a short message sending terminal sends a short message to the subscriber's mobile terminal via a short message center, the short message sending terminal inquires service information. After receiving a receipt status signaling returned back from the short message receiving terminal, the short message sending terminal sends out a request to the service platform for sending individuation receipt information. The service platform sends the receipt information to the short message sending terminal. The present invention presents an application to the communication network for opening individuation receipt service and customizing the individuation receipt information via the subscriber so as to enable the communication network to send out a short message receipt information which can highlight the subscriber's own individuality to the short message sending terminal according to the subscriber's requirement after the subscriber's mobile terminal receives the short message.

4 Claims, 1 Drawing Sheet

US 8,090,352 B2

Figure 1:
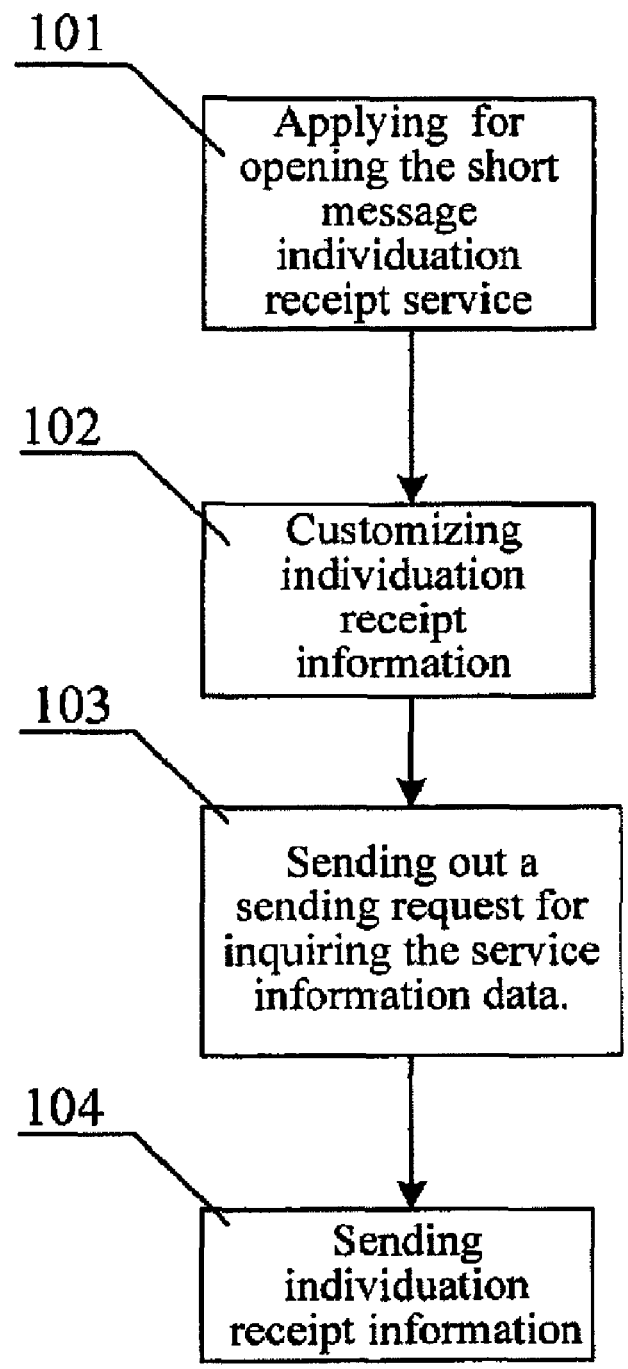

METHOD FOR SENDING INDIVIDUATION RECEIPT INFORMATION BY A SHORT MESSAGE RECEIVING TERMINAL

FIELD OF THE INVENTION

The present invention relates to a method for a short message receiving terminal to send individuation receipt information, particularly to a method for a subscriber terminal receiving the short message to send individuation short message receipt information to a subscriber terminal sending the short message in the communication network.

BACKGROUND

With development of communication techniques, the contents of various value-added services are greatly enriched. The short message service is a kind of value-added service provided by communication network operators with extremely high use value. Currently, almost all mobile subscribers are able and willing to adopt the way of sending short messages for transmitting information to others. Because fixed phones with ability of sending and receiving short messages are put into operation, the short message value-added service over a rigid communication network is enabled. However, for the reason of network busyness, signal attenuation, terminal working status and so on, the phenomenon that short messages can not arrive may sometimes happen. Therefore, conventional mobile operators provide receipt confirmation service of short messages, i.e. short message receipt service, for short message sending subscribers so as to enable the short message sending subscribers to know that the short message receiving terminal has received the short messages sent out by the short message sending subscribers themselves.

The short message receipt service in the conventional network is also called status report service. It sends receipt information to a cell phone in the way of signaling. The cell phone prompts the subscriber in a fixed way. The existing status report service has following deficiencies:

1, Most of the existing cell phones, especially the old style cell phones, low-rank cell phones, do not support the above function;

2, The character content of the receipt information seen by the subscriber from the cell phone completely depends on the configuration of terminal manufactures and is unchangeable and machine-made.

3, The operators can not control the content of the receipt information to provide value-added service for subscribers.

4, It is needed to perform some configuration operations on the terminal in order to use the status report service. However, most subscribers (especially middle-aged subscribers) do not know how to use the status report service.

In order to overcome the above deficiencies, it can be adopted a way of presetting the short message receipt information by the short message sending subscriber. After the terminal of the short message receiving subscriber receives the short message, the communication network sends the short message receipt information together with the conventional receipt signaling to the cell phone of the short message sending subscriber. However, this way also has some deficiencies that the short message receiving subscriber can not send the information which can express the short message receiving subscriber's own individuality to the short message sending subscriber. Therefore, the short message receiving subscriber's requirement of highlighting his individuality can not be satisfied.

SUMMARY with regard to the above deficiencies and shortcomings by the way of adopting the conventional status report service and pre-customizing the receipt information as the short message receipt by the short message sending subscriber, the object of the present invention is to provide a method for a short message receiving terminal to send individuation receipt information so as to enable the short message sending subscriber to receive the individuation receipt information customized by the short message receiving subscriber himself.

In order to implement the above object, in according to the present invention, a method for the short message receiving terminal to send individuation receipt information can execute the following steps:

Step 1, a subscriber applies for opening individuation receipt service after a short message is received towards a communication network storing service information of the individuation receipt service opened by the subscriber;

Step 2, the subscriber configures and customizes the individuation receipt information in the communication network;

Step 3, after the short message sending terminal sends the short message to the subscriber's mobile terminal via a short message center. The short message center knows that the subscriber is a subscriber who has opened the individuation receipt service according to the service information; after receiving the receipt status signaling returned by the subscriber's short message receiving terminal, the short message center sends out a request to the service platform for sending the individuation receipt information to the short message sending terminal; and Step 4, the service platform sends the individuation receipt information to the short message sending terminal.

It can be seen from the above technical solution, in accordance with the present invention, the subscriber applies for opening individuation receipt service towards the communication network and customizes the individuation receipt information by the subscriber himself. Therefore, the communication network is enabled to send out the subscriber's individuation receipt information to the short message sending terminal according to the subscriber's customization requirement while the subscriber's terminal is performing the conventional status report service after receiving the short message so as to meet the increasingly high need of the subscriber for the quality of communication services and enable the communication network operator to provide the subscriber with more and richer data value-added services.

The present invention will be described in more detail with reference to the drawings and embodiments.

BRIEF DESCRIPTION OF THE DRAWING(S)

FIG. 1 is a flow chart of one embodiment of the present invention.

DETAILED DESCRIPTION

The flow of one embodiment of the present invention is shown as FIG. 1. The present embodiment may be implemented in a mobile communication network. The steps are as follows:

Step 101, a subscriber in the mobile communication network applies towards the mobile communication network for opening an individuation receipt service after a short message is received by logging on the webpage of a mobile operator. After receiving the subscriber's application and pass the corresponding authentication process, the mobile communication network generates service information data indicating that the subscriber's mobile terminal has opened the individuation receipt service and stores the service information data into the home location register to which the subscriber's mobile terminal belongs;

Step 102, the subscriber applying for opening the individuation receipt service, in the mobile communication network, customizes individuation receipt information suitable for being sent to others and highlighting his own individuality.

Step 103, after a short message sending terminal in the mobile communication network sends the short message to the subscriber's mobile terminal via a short message center, the short message center inquires the home location register of the mobile terminal receiving the short message. By the service information data stored in the home location register, it can be known that the mobile terminal subscriber receiving the short message is a subscriber who has opened the individuation receipt service. After receiving the status signaling of the receipt short message returned back by the mobile terminal receiving the short message, the mobile terminal subscriber sends out a request to a service platform for sending individuation receipt information customized by the subscriber to the short message sending terminal.

Step 104, the service platform sends individuation receipt information customized by the subscriber of the mobile terminal receiving the short message to the short message sending terminal.

In the present embodiment, the mobile subscriber may also apply for opening the individuation receipt service by calling the service phone of a mobile communication corporation or directly by the manual service provided by a business hall of the mobile communication network, After customizing the receipt information, the subscriber of the mobile terminal receiving the short message can customize a plurality of different individuation receipt information completely according to his own hobby, individuality and specific need and can customize different individuation receipt information corresponding to numbers of different short message sending terminals. In addition, in terms of the way of sending individuation receipt information, it can be configured to send different individuation receipt information according to different time period. Further more, the subscriber of the mobile terminal receiving the short message not only may directly customize individuation receipt information provided by the communication network, but also may produce and customize his own individuation receipt information by the way of self-editing and self-compiling.

In the present invention, the subscriber applying for opening the short message individuation receipt service may also open the service information data by the stored in the service platform. At this time, the short message center may know whether the subscriber of the terminal receiving the short message has opened individuation receipt service by sending out an inquiry signaling to the service platform.

The present invention can not only be implemented in the short message individuation receipt service of the mobile communication network, but also can be implemented in the rigid communication network.

Finally, it should be understood that the above embodiments are only used to explain, but not to limit the technical solution of the present invention. In despite of the detailed description of the present invention with referring to above preferred embodiments, it should be understood that various modifications, changes or equivalent replacements can be made by those skilled in the art without departing from the spirit and scope of the present invention and covered in the claims of the present invention.

What is claimed is:

1. A method for a short message receiving terminal to send individuation receipt information, comprising:

Step 1, applying, by a subscriber, for opening individuation receipt service after a short message is received towards a communication network storing service information of the individuation receipt service opened by the subscriber;

Step 2, configuring and customizing, by the subscriber, the individuation receipt information in the communication network;

Step 3, after sending the short message to the subscriber's terminal by the short message sending terminal via a short message center, knowing, by the short message center, that the subscriber is a subscriber who has opened the individuation receipt service according to the service information; after receiving the receipt status signaling returned by the subscriber's short message receiving terminal, sending out a request to a service platform for sending the individuation receipt information to the short message sending terminal; and Step 4, sending, by the service platform, the individuation receipt information to the short message sending terminal.

2. The method according to claim 1, wherein the subscriber in the step 1 is a subscriber in a mobile communication network or a rigid communication network; the subscriber applies for opening the individuation receipt service by logging on a webpage of the communication network, or by a service phone, or directly by a business hall of the communication network.

3. The method according to claim 1, wherein the subscriber in the step 2 subscribes a service according to a channel provided by the communication network or configures and customizes the individuation receipt information in a way of self-compiling.

4. The method according to claim 1, wherein the short message center in the step 3 inquires the service information from the home location register of the subscriber's short message receiving terminal or the service platform.

* * * * *